(12) United States Patent
Ichimiya

(10) Patent No.: US 11,140,310 B2
(45) Date of Patent: Oct. 5, 2021

(54) FOCUS DETECTION APPARATUS AND METHOD WHICH PERFORMS HIGHLY ACCURATE AF CONTROL INDEPENDENT OF THE BRIGHTNESS OF THE SUBJECT

(71) Applicant: CANON KABUSHIKI KAISHA, Tokyo (JP)

(72) Inventor: Takashi Ichimiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/070,325

(22) Filed: Oct. 14, 2020

(65) Prior Publication Data

US 2021/0120169 A1 Apr. 22, 2021

(30) Foreign Application Priority Data

Oct. 16, 2019 (JP) .............................. JP2019-189657
Jul. 20, 2020 (JP) .............................. JP2020-123914

(51) Int. Cl.
*H04N 5/232* (2006.01)
*H04N 5/235* (2006.01)

(52) U.S. Cl.
CPC ....... *H04N 5/23212* (2013.01); *H04N 5/2351* (2013.01); *H04N 5/2355* (2013.01); *H04N 5/23245* (2013.01)

(58) Field of Classification Search
CPC ............. H04N 5/23212; H04N 5/2355; H04N 5/23245; H04N 5/2351
See application file for complete search history.

(56) References Cited

U.S. PATENT DOCUMENTS

| | | | | |
|---|---|---|---|---|
| 5,526,088 A | * | 6/1996 | Kusaka | G02B 7/34 396/111 |
| 7,920,202 B2 | * | 4/2011 | Park | H04N 5/23212 348/349 |
| 8,224,172 B2 | * | 7/2012 | Sasaki | H04N 5/23218 396/95 |
| 9,848,150 B2 | * | 12/2017 | Uchida | H03M 1/1028 |
| 10,477,098 B2 | * | 11/2019 | Shimizu | G02B 7/365 |

FOREIGN PATENT DOCUMENTS

JP 2014-220663 A 11/2014

* cited by examiner

*Primary Examiner* — Luong T Nguyen
(74) *Attorney, Agent, or Firm* — Cowan, Liebowitz & Latman, P.C.

(57) ABSTRACT

A focus detection apparatus includes an image sensor having a plurality of pixels and an AD converter configured to switch a low-luminance conversion mode and a high-luminance conversion mode, a determination unit configured to determine whether an output signal is a signal AD converted in both the low-luminance conversion mode and the high-luminance conversion mode or a signal AD converted in only one of the two modes, an inhibition unit configured to, in a case where the output signal from the AD converter is a signal AD converted in both the two modes, inhibit a level difference of the output signal at a boundary between the two modes, and a calculation unit configured to, based on the signal for which the level difference is inhibited, calculate an amount of defocus of the imaging lens.

19 Claims, 12 Drawing Sheets

FOCUS DETECTION APPARATUS AND METHOD WHICH PERFORMS HIGHLY ACCURATE AF CONTROL INDEPENDENT OF THE BRIGHTNESS OF THE SUBJECT

BACKGROUND OF THE INVENTION

Field of the Invention

The present invention relates to a focus detection technique in an image capturing apparatus.

Description of the Related Art

Conventionally, auto-focus (hereinafter AF) apparatuses that, in accordance with a focus state of a subject detected by an image capturing sensor having a photoelectric conversion element, adjusts a focus distance of an image capturing lens to automatically focus on the subject are known. Also, controlling accumulation time and output gain of an image capturing sensor in accordance with a brightness or contrast of a subject is known.

For example, in Japanese Patent Laid-Open No. 2014-220663, a technique of providing a column AD converter and enlarging the dynamic range of an image capturing sensor capable of digital output has been disclosed. By switching a column amplifier gain setting in accordance with an amount of light for each pixel, and performing digital gain correction processing on an output code after digital conversion in accordance with this gain setting, artificially a bit extension proportional to the gain ratio is performed. By using such an image capturing sensor to perform focus detection, it is possible perform AF control independent of subject contrast.

However, in the conventional technique disclosed in the above-described Japanese Patent Laid-Open No. 2014-220663, there are cases in which, in pixels for which the quantity of incident light is an amount of light around where the gain switches, due to the influence of column amplifier gain and offset error, output is discontinuous among nearby pixels. Accordingly, an error occurs in focus detection results.

SUMMARY OF THE INVENTION

The present invention was conceived in view of the above-described problems, and an objective thereof is to provide a focus detection apparatus that can perform highly accurate AF control independent of the brightness of the subject.

According to a first aspect of the present invention, there is provided a focus detection apparatus, comprising: an image sensor having a plurality of pixels that receive light from a subject that passes through an imaging lens; and an AD converter configured to, in accordance with a signal value of a pixel signal of the plurality of pixels, switch a low-luminance conversion mode and a high-luminance conversion mode, and perform an AD conversion of a signal from the plurality of pixels; and at least one processor or circuit configured to function as: a determination unit configured to determine whether an output signal from the AD converter is a signal AD converted in both the low-luminance conversion mode and the high-luminance conversion mode or a signal AD converted in only one of the low-luminance conversion mode and the high-luminance conversion mode; an inhibition unit configured to, in a case where the output signal from the AD converter is determined by the determination unit to be a signal AD converted in both the low-luminance conversion mode and the high-luminance conversion mode, inhibit a level difference of the output signal at a boundary between the low-luminance conversion mode and the high-luminance conversion mode; and a calculation unit configured to, based on the signal for which the level difference is inhibited, calculate an amount of defocus of the imaging lens.

According to a second aspect of the present invention, there is provided an image capturing apparatus including a focus detection apparatus comprising: an image sensor having a plurality of pixels that receive light from a subject that passes through an imaging lens; and an AD converter configured to, in accordance with a signal value of a pixel signal of the plurality of pixels, switch a low-luminance conversion mode and a high-luminance conversion mode, and perform an AD conversion of a signal from the plurality of pixels; and at least one processor or circuit configured to function as: a determination unit configured to determine whether an output signal from the AD converter is a signal AD converted in both the low-luminance conversion mode and the high-luminance conversion mode or a signal AD converted in only one of the low-luminance conversion mode and the high-luminance conversion mode; an inhibition unit configured to, in a case where the output signal from the AD converter is determined by the determination unit to be a signal AD converted in both the low-luminance conversion mode and the high-luminance conversion mode, inhibit a level difference of the output signal at a boundary between the low-luminance conversion mode and the high-luminance conversion mode; and a calculation unit configured to, based on the signal for which the level difference is inhibited, calculate an amount of defocus of the imaging lens.

According to a third aspect of the present invention, there is provided a method of controlling a focus detection apparatus that is equipped with an image sensor having a plurality of pixels that receive light from a subject that passes through an imaging lens; and an AD converter configured to, in accordance with a signal value of a pixel signal of the plurality of pixels, switch a low-luminance conversion mode and a high-luminance conversion mode, and perform an AD conversion of a signal from the plurality of pixels, the method comprising: determining whether an output signal from the AD converter is a signal AD converted in both the low-luminance conversion mode and the high-luminance conversion mode or a signal AD converted in only one of the low-luminance conversion mode and the high-luminance conversion mode; in a case where the output signal from the AD converter is determined by the determination unit to be a signal AD converted in both the low-luminance conversion mode and the high-luminance conversion mode, inhibiting a level difference of the output signal at a boundary between the low-luminance conversion mode and the high-luminance conversion mode; and based on the signal for which the level difference is inhibited, calculating an amount of defocus of the imaging lens.

Further features of the present invention will become apparent from the following description of exemplary embodiments with reference to the attached drawings.

DESCRIPTION OF THE EMBODIMENTS

Figure 1:
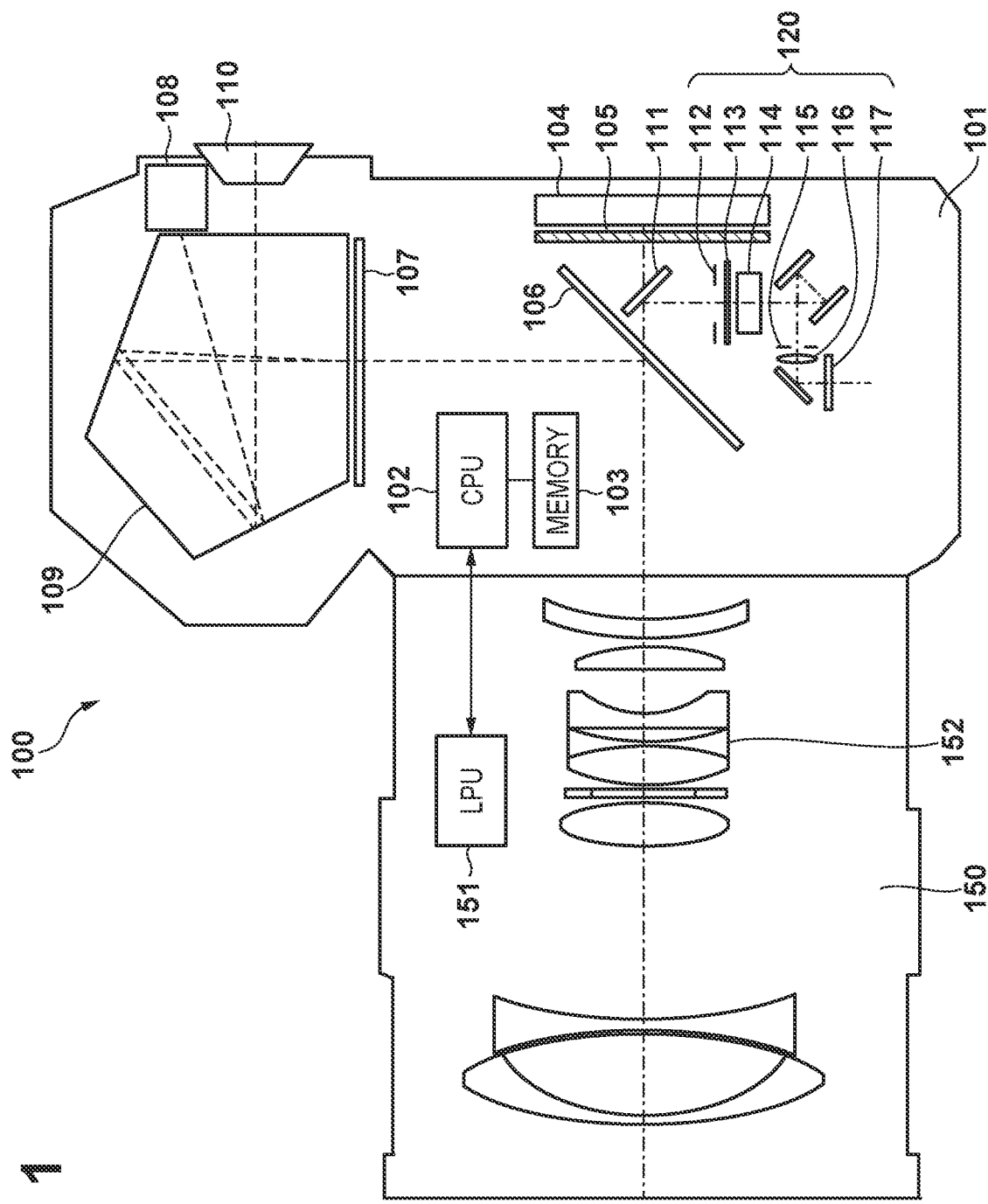
FIG. 1 is a side view of a digital camera used as an image capturing apparatus according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a side view of a digital camera according to a first embodiment of an image capturing apparatus of the present invention.

In FIG. 1, the digital camera 100 includes a camera body 101 and a lens (imaging lens) 150. Note that, in FIG. 1, the internal configuration is illustrated as transparent for easy description. The camera body 101 includes a CPU 102, a memory 103, an image sensor 104, a shutter 105, a half mirror 106, a focusing screen 107, a photometric sensor 108, a pentaprism 109, an optical finder 110, and a sub-mirror 111. Furthermore, the camera body 101 includes a focus detection unit 120 including a field mask 112, an infrared cut filter 113, a field lens 114, a diaphragm 115, a secondary image forming lens 116, and a focus detection sensor (focus detecting sensor) 117. The lens 150 includes an LPU 151 and a lens group 152.

The CPU 102 includes a microcomputer and performs each type of control in the camera body 101. The memory 103 is a memory such as a RAM or a ROM connected to the CPU 102, and stores data and programs executed by the CPU 102. The image sensor 104 includes a CCD or a CMOS sensor, or the like including an infrared cut filter and a low pass filter, and light incident on the lens 150 is formed into a subject image. The shutter 105 can be driven to open and close, and is closed when not capturing images to shield the image sensor 104 from light, as is opened when image capturing to expose the image sensor 104. The half mirror 106 reflects a portion of light incident on the lens 150 when not capturing images to form the portion into an image on the focusing screen 107. The photometric sensor 108 includes an image sensor such as a CCD or a CMOS sensor, and performs object recognition processing such as a photometric operation, a face detection operation, a tracking operation, and a light source detection. The pentaprism 109 reflects, toward the photometric sensor 108 and optical finder 110, light having passed through the focusing screen 107.

The half mirror 106 transmits a portion of light that enters the lens 150. The transmitted light redirected downward by a rear sub-mirror 111, passes through the field mask 112, the infrared cut filter 113, the field lens 114, the diaphragm 115, and the secondary image forming lens 116, and is formed into an image on the focus detection sensor 117 in which photoelectric conversion elements are two-dimensionally arranged. The focus detection unit 120 detects a focus state of the lens 150 based on an image signal obtained by photoelectric conversion of the image.

The LPU 151 includes a microcomputer and performs control to move the lens group 152 in the lens 150. For example, upon receiving an amount of defocus indicating the amount of focus shift from the CPU 102, the LPU 151 moves the lens group 152 to a position where focus can be achieved (hereinafter referred to as a "focusing position") based on the amount of defocus.

Figure 2:
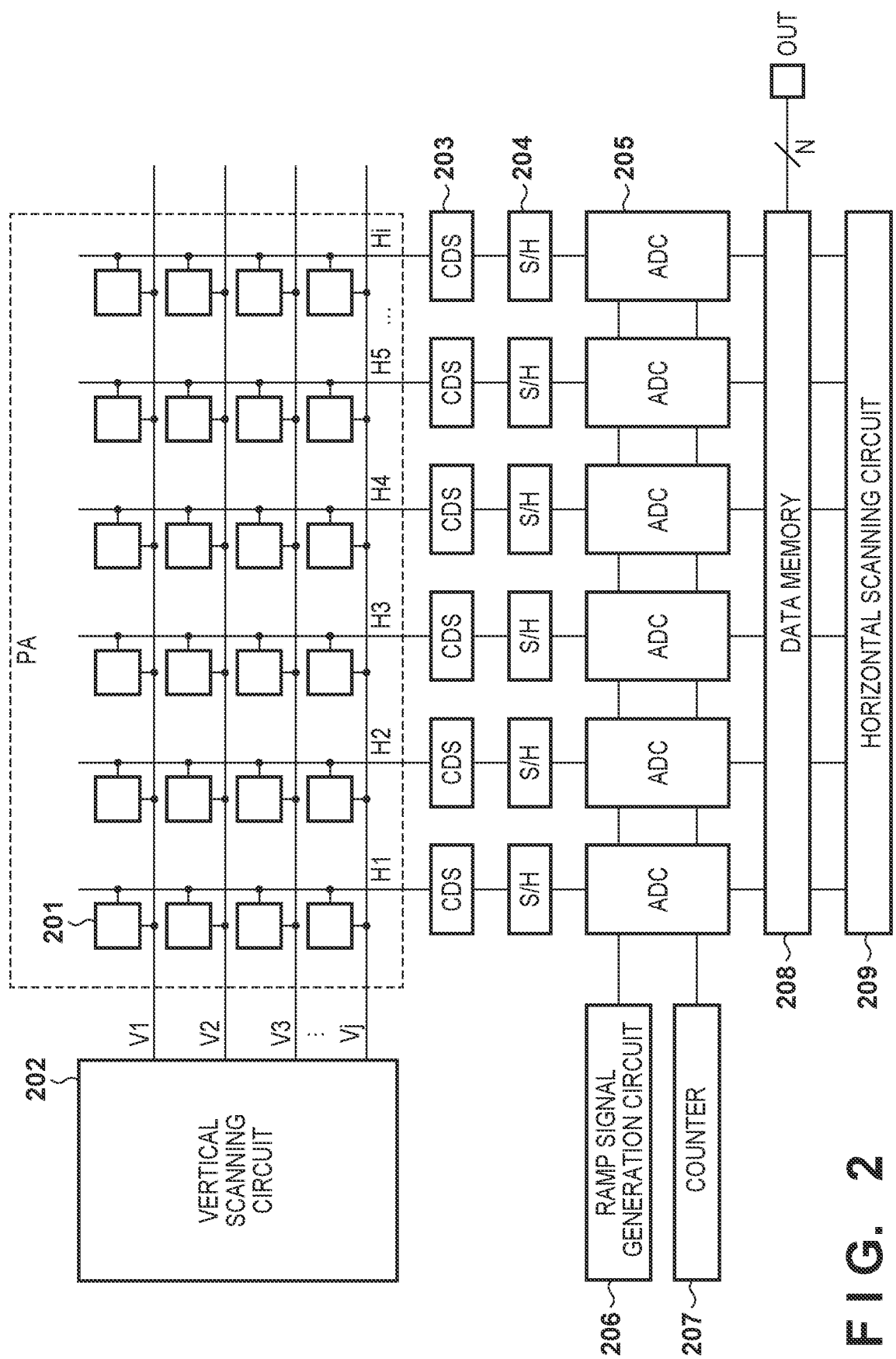
FIG. 2 is a view illustrating an overall configuration of a focus detection sensor.

FIG. 2 is a view illustrating an overall configuration of a focus detection sensor 117 comprising a two-dimensional CMOS area sensor.

In a pixel region PA, i columns×j rows (i and j are integers) of pixels 201 are arranged in a matrix pattern. Incident light from a subject is photoelectrically converted by the pixels 201. The signal photoelectrically converted in each pixel is transferred for each row to vertical output lines H1 to Hi by a driving signal supplied by drive lines V1 to Vj from a vertical scanning circuit 202.

A CDS amplifier 203 arranged for each column amplifies a signal generated by the photoelectric conversion after performing CDS (correlated double sampling) processing thereon. A pixel signal read out from the pixel 201 to a vertical output line is inputted to the CDS amplifier 203 of each column, and a predetermined gain is applied together with pixel noise removal. Output of the CDS amplifier 203 is sampled and held for each column by a sample-and-hold circuit 204. Each pixel signal that is sampled and held by the sample-and-hold circuit 204 is, thereafter, converted into a digital signal (pixel data) by an AD converter (ADC) 205 arranged for each column. In the ADC 205 of each column, a ramp signal that is used for a reference in comparison with the pixel signal is supplied commonly from a ramp signal generation circuit 206. Also, the output of the counter 207 is connected commonly to the ADC 205 of each column. The conversion result of the ADC 205 of each column is stored in a data memory 208, and thereafter, selected/transferred one column at a time by a horizontal scanning circuit 209, and outputted from the focus detection sensor 117.

Note that in the above, a case in which focus detection is performed using the focus detection sensor 117 which is dedicated to focus detection is described, but the focus detection may also be performed using the image sensor 104 which is for capturing images for recording. In such a case, configuration may be such that pixels with a plurality of photoelectric conversion units for one microlens are arranged two-dimensionally in the image sensor 104, and each of the plurality of photoelectric conversion units in one pixel receives light from a pupil region of a different exit pupil of the lens 150. By this configuration, it is possible to perform phase-difference focus detection in the image capturing plane. The autofocus operation (AF operation) described below can be performed similarly by using this kind of image sensor 104. Specifically, description will be given later in a fourth embodiment.

Figure 3:
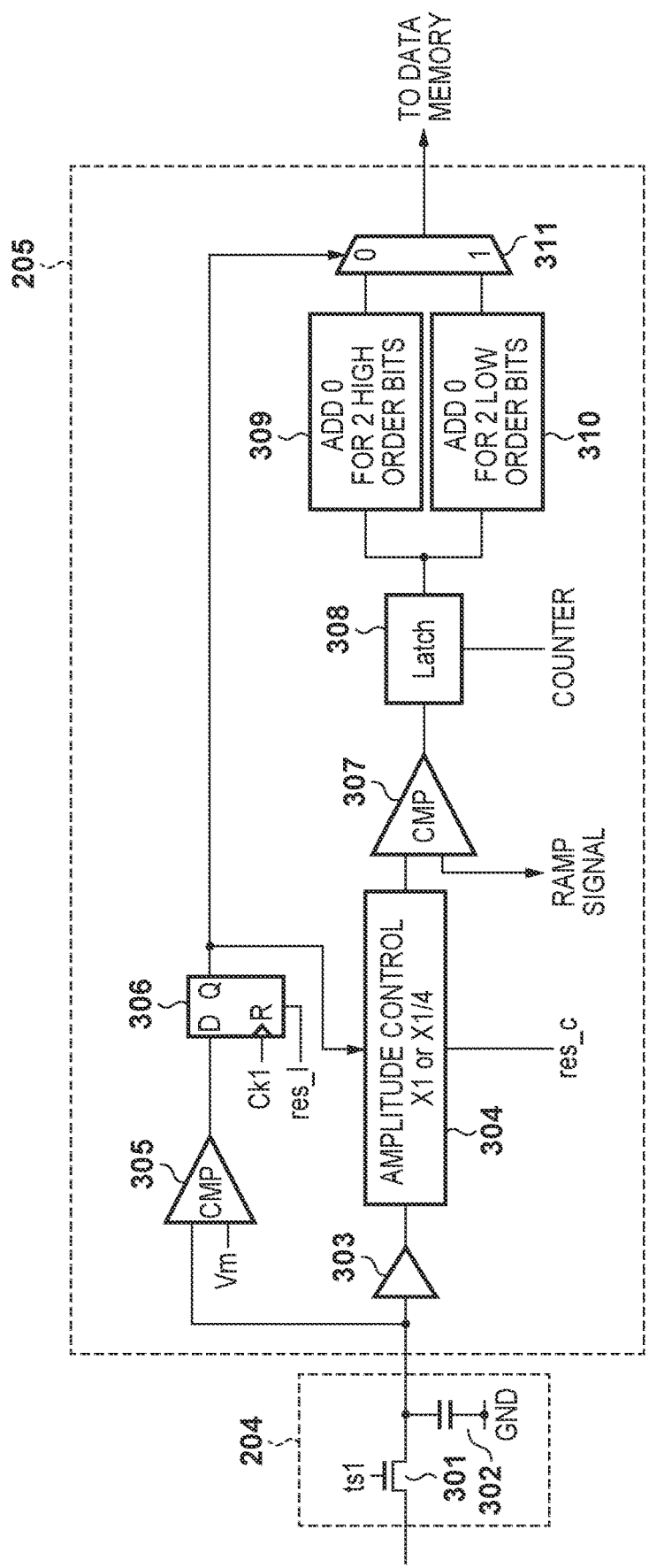
FIG. 3 is a view illustrating an ADC circuit configuration.

Next, FIG. 3 is a view illustrating an example of a configuration of the sample-and-hold circuit 204 and an N-bit ADC 205 of each column in the focus detection sensor 117. In this example, by performing AD conversion separately for a case of a low luminance where the level of a pixel signal is less than a threshold value (reference voltage) Vm and a case of a high luminance where it is greater than or equal to the threshold (reference voltage) Vm, the time required for the AD conversion is reduced.

The sample-and-hold circuit 204 is configured to have a first signal transfer switch 301 and a first storage capacitor 302. The pixel signal inputted to the sample-and-hold circuit 204 is held in the first storage capacitor 302 via the first signal transfer switch 301. The first storage capacitor 302 is connected to the amplitude control unit 304 via a buffer 303 and is also connected to a first comparator 305. In the first comparator 305, a signal of the first storage capacitor 302 is compared with the reference voltage Vm, and the result of that comparison is conveyed to the signal amplitude control unit 304 via a flip flop (FF) 306. An output of the first comparator 305 is connected to a data input terminal of the FF 306, and data is captured and held at the rising edge of the signal ck1, and reset by the signal res_1. The reference voltage Vm is made to be a voltage corresponding to ¼ of the full-scale amplitude of the AD conversion here.

The signal amplitude control unit 304 control the amplitude of the pixel signal based on the result of the comparison inputted from the FF 306. Specifically, in a case where the pixel signal is less than the reference voltage Vm, the amplitude is outputted as is (1-times), and in a case where the pixel signal is greater than or equal to the reference voltage Vm, the amplitude is outputted at ¼ times. The output of the signal amplitude control unit 304 is connected to the input terminal of a second comparator 307.

Figure 4:
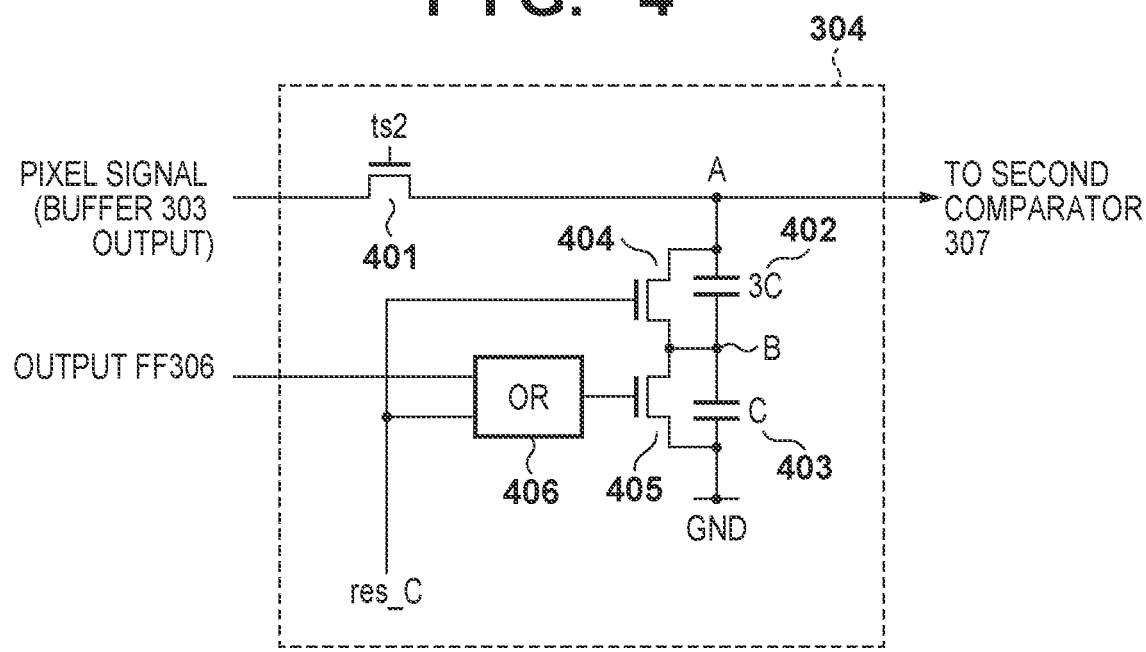
FIG. 4 is a view illustrating an amplitude control unit circuit configuration.

FIG. 4 is a view illustrating a configuration of the signal amplitude control unit 304. First, a pixel signal inputted from the buffer 303 to the signal amplitude control unit 304 is stored in a second storage capacitor 402 and a third storage capacitor 403 via a second signal transfer switch 401. The second storage capacitor 402 and the third storage capacitor 403 are connected in series. The first short-circuit switch 404 and second short-circuit switch 405 short-circuit the two terminals of the respective capacitors are connected to the second storage capacitor 402 and the third storage capacitor 403.

In the case where the pixel signal is greater than or equal to a reference voltage Vm, the output of the first comparator 305 is a High level, and since the output of the FF 306 becomes the High level at a timing when a signal ck1 is inputted, the second short-circuit switch 405 is short circuited via the OR gate 406. By this short-circuiting operation, the storage capacitor changes, and so the amplitude of the pixel signal changes. In this example, since the capacitance of the second storage capacitor 402 is set to three times the third storage capacitor 403, the voltage of an A point in a case where the second short-circuit switch 405 is short circuited becomes ¼ the potential of the original pixel signal.

Returning to FIG. 3, in the second comparator 307, the pixel signal after the amplitude control and the ramp signal level are compared. The output of the second comparator 307 is inputted to a latch circuit 308. Count data of the counter 207 is inputted to the latch circuit 308. When the ramp signal exceeds a level of the pixel signal, and the output of the second comparator 307 is reversed, the counter value at that time is held in the latch circuit 308. In a case where the ADC 205 outputs N bits, in this example, the counter may perform a count proportional to a maximum of (N−2) bits. For count data held in the latch circuit 308, a predetermined number of high order or low order bits is added in bit extension units 309 and 310. In a case of counting up to (N−2) in relation to N bits of output, 2 high order or low order bits of "0" are added, and N bits of data are outputted. Next, in an output data selecting unit 311, in accordance with output by the FF 306, the data of one side is selected, and outputted to the data memory 208.

Below, for convenience of explanation, the AD conversion in the case where the pixel signal is less than the reference voltage Vm will be referred to as the low-luminance conversion mode and the AD conversion in the case where the pixel signal is greater than or equal to the reference voltage Vm will be referred to as the high-luminance conversion mode. Also, an AD conversion that used both the low-luminance conversion mode and the high-luminance conversion mode will be referred to as an HDR (a high dynamic range) mode. In this example, pixel signals are divided into low luminance and high luminance, and a high-luminance voltage is reduced by ¼, (N−2) bits are counted, an N-bit conversion is performed, and the result is outputted, and therefore it is possible to reduce the time that it takes for AD conversion.

Figure 5:
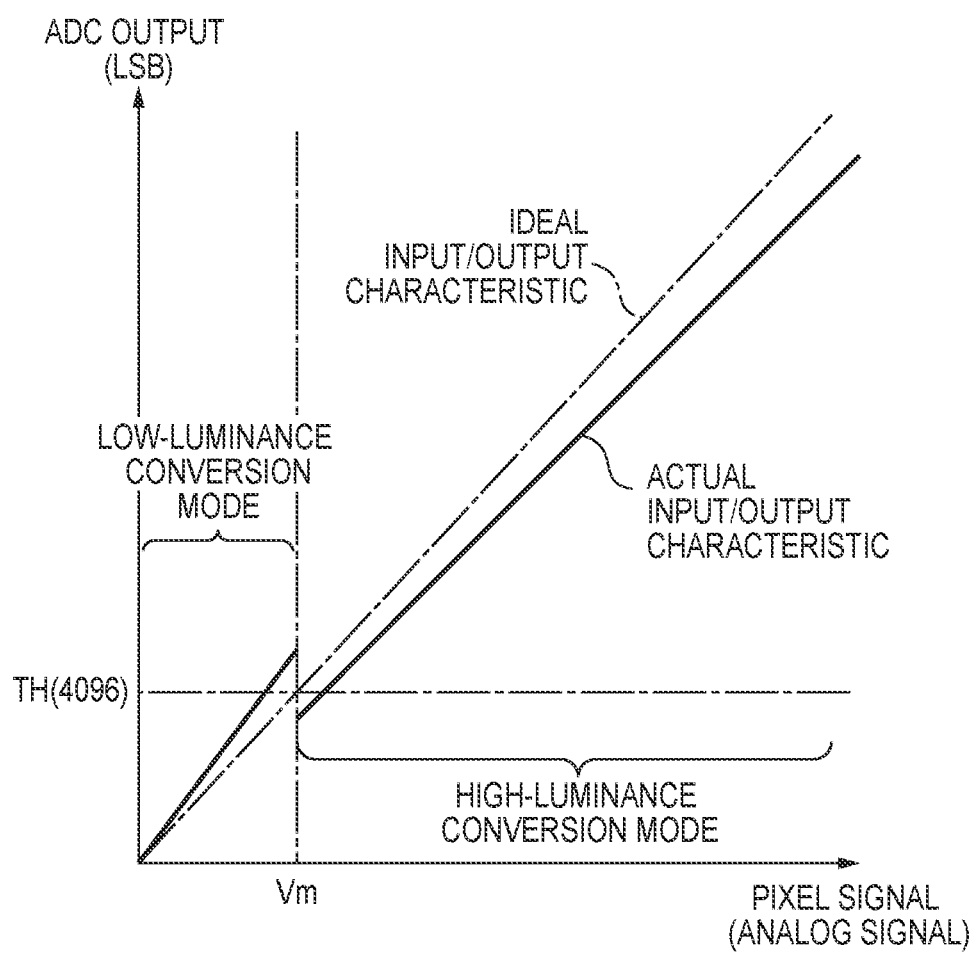
FIG. 5 is a view schematically illustrating an ADC input/output characteristic.

FIG. 5 is a view schematically illustrating a relationship between a pixel signal which is an analog input signal and an AD conversion output which is N-bit digital data at the point in time of output to the data memory 208; that is input/output characteristics of the ADC 205. It is assumed that the reference voltage Vm is ideally a voltage at which the AD converted output code becomes 4096 LSB. In the case where an ideal input/output characteristic is achieved, when the input signal matches the reference voltage Vm as illustrated by the dashed lines, the output code is 4096 LSB, and the input/output characteristic where the input signal is the reference voltage Vm or more and the input/output characteristic where the input signal is less than Vm should connect in a straight line form. However, in practice, due to variation in the storage capacity of the signal amplitude control unit 304, characteristics of the short-circuit switch, or the like, there are cases where the relative relationship between the ramp signal amplitude and the pixel signal amplitude in the case of a low luminance and the case of a high luminance deviates from what is envisioned. In such a case, there is a deviation from the ideal input/output characteristic as illustrated in solid lines, and a level difference or a difference in the slope in the input/output characteristic where the reference voltage Vm is the boundary ends up occurring.

Figure 6:
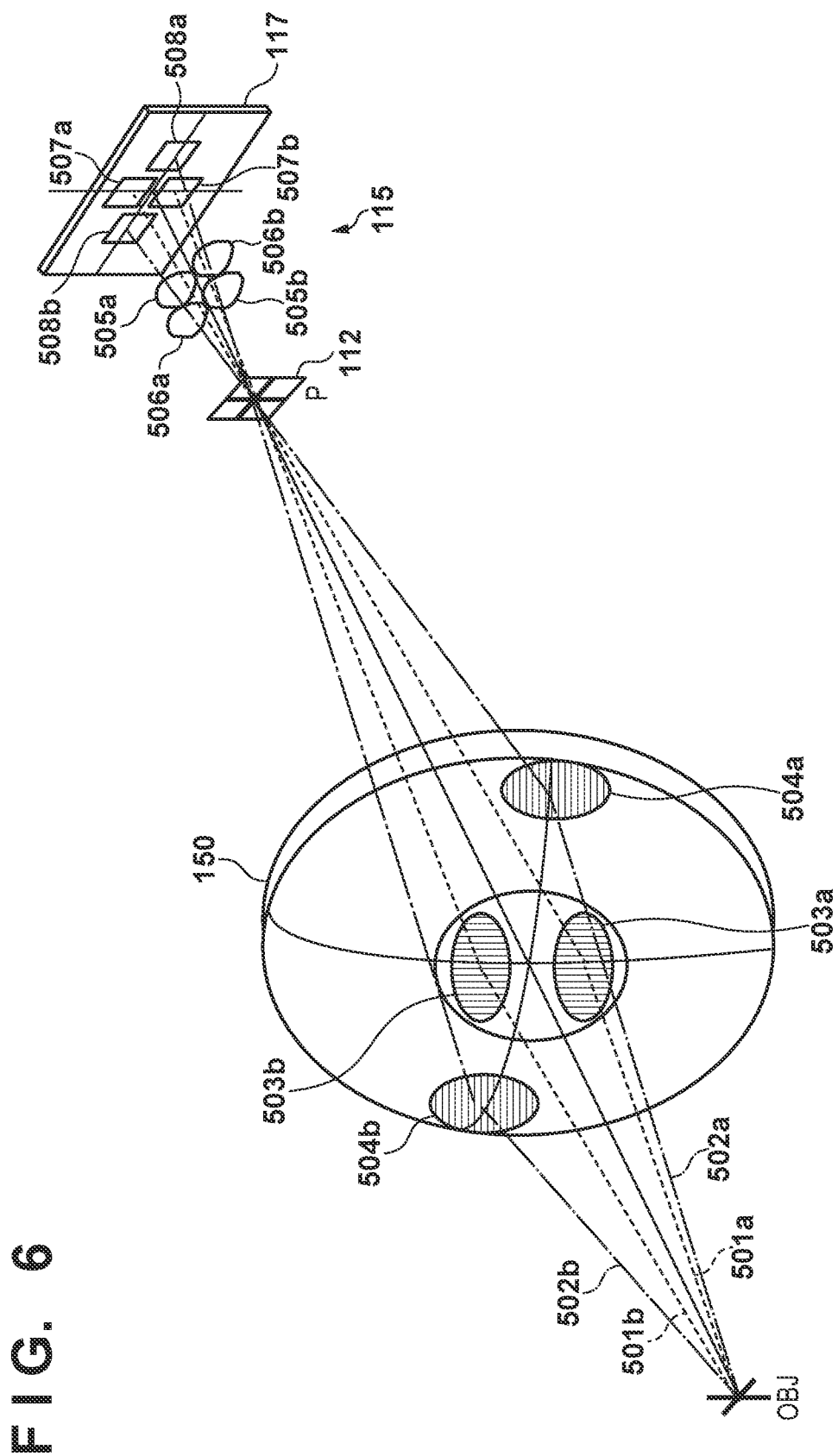
FIG. 6 is a view for conceptually explaining a principle of focus detection.

FIG. 6 is a view for explaining conceptually the principle of focus detection.

In FIG. 6, the luminous fluxes 501*a* and 501*b* from an object OBJ, pass through the pupils (pupil regions) 503*a* and 503*b* of the lens 150, and form and image on the focal plane P (the primary image formation plane) in the vicinity of a field mask 112. The luminous fluxes 501*a* and 501*b* are divided into secondary image forming lenses 505*a* and 505*b*, and again form an image on image forming areas 507*a* and 507*b* which are on a pixel region PA of the focus detection sensor 117, and by a correlation operation on the two subject images on the top and bottom, an amount of defocus is calculated.

Similarly, the luminous fluxes 502a and 502b pass through the pupils 504a and 504b of the lens 150 and form an image on the focal plane P (the primary image formation plane) in the vicinity of the field mask 112. The luminous fluxes 504a and 504b are divided into secondary image forming lenses 506a and 506b, and again form an image on image forming areas 508a and 508b which are on a pixel region PA of the focus detection sensor 117, and by a correlation operation on the two subject images on the left and right, an amount of defocus is calculated.

Figure 7A:
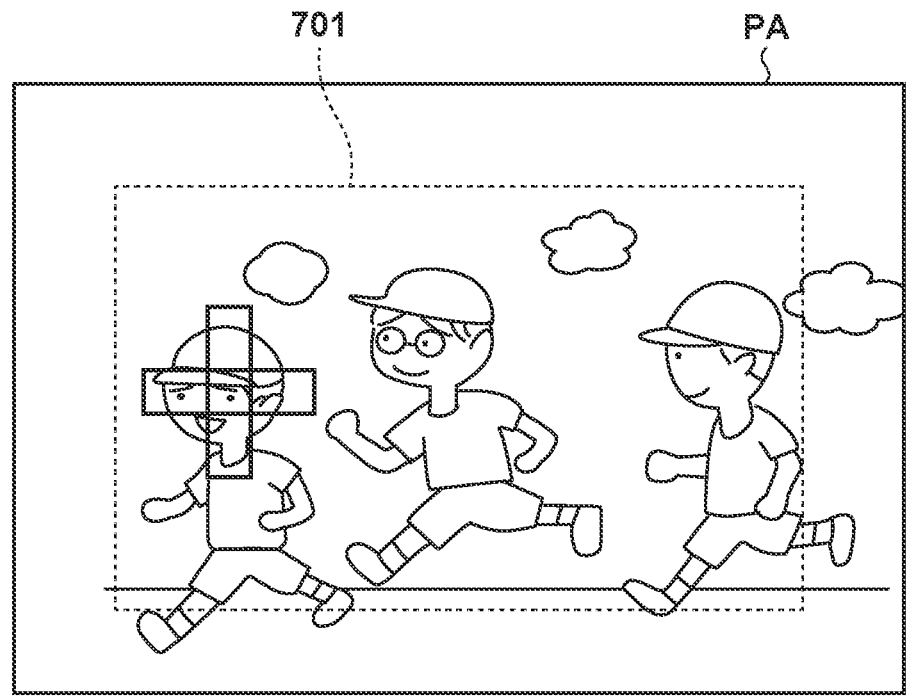
FIGS. 7A and 7B are views illustrating a viewfinder screen.
Figure 7B:
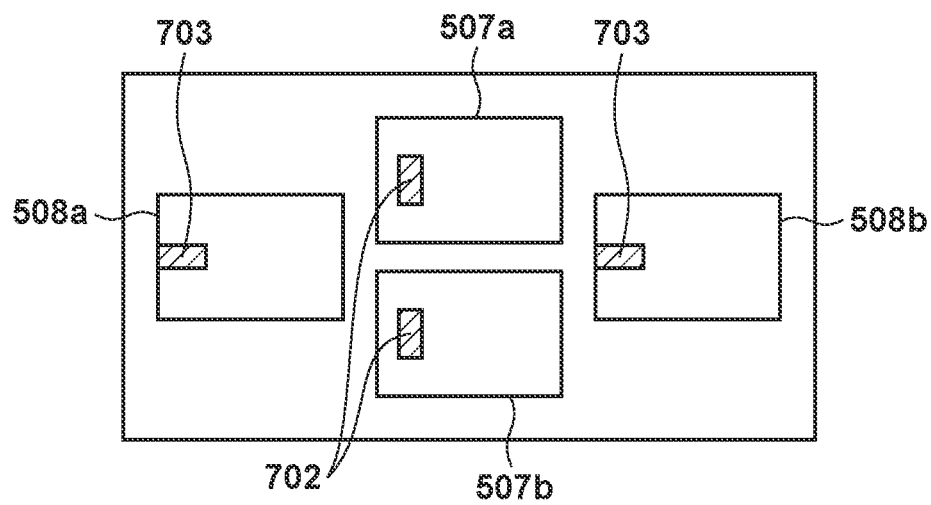

FIGS. 7A and 7B are views illustrating a relationship between a region in which AF is possible in the viewfinder screen and the image forming area on the focus detection sensor.

FIG. 7A illustrates a viewfinder screen, and a region in which AF is possible 701 formed by image forming areas 507a, 507b, 508a, and 508b is arranged. Here, when a face of a person in the lead is designated as an AF region by the photographer, as illustrated in FIG. 7B, a pixel signal of the AF region 702 which is a part of the image forming areas 507a and 507b of the pixel region PA is extracted, and an AF operation is performed. Also, a pixel signal of the AF region 703 which is a part on the image forming areas 508a and 508b is extracted, and an AF operation is performed. In this way, it is possible to detect a focus state even of a subject for which there is only either a vertical or a horizontal contrast.

Also, it is possible to divide the image forming areas 507a, 507b, 508a, and 508b into a plurality of regions, and by performing the AF operation in each of the regions, detect a distribution of the focus state in the viewfinder screen. It is possible for the CPU 102 to determine the main subject from the obtained distribution information and perform AF control.

Figure 8A:
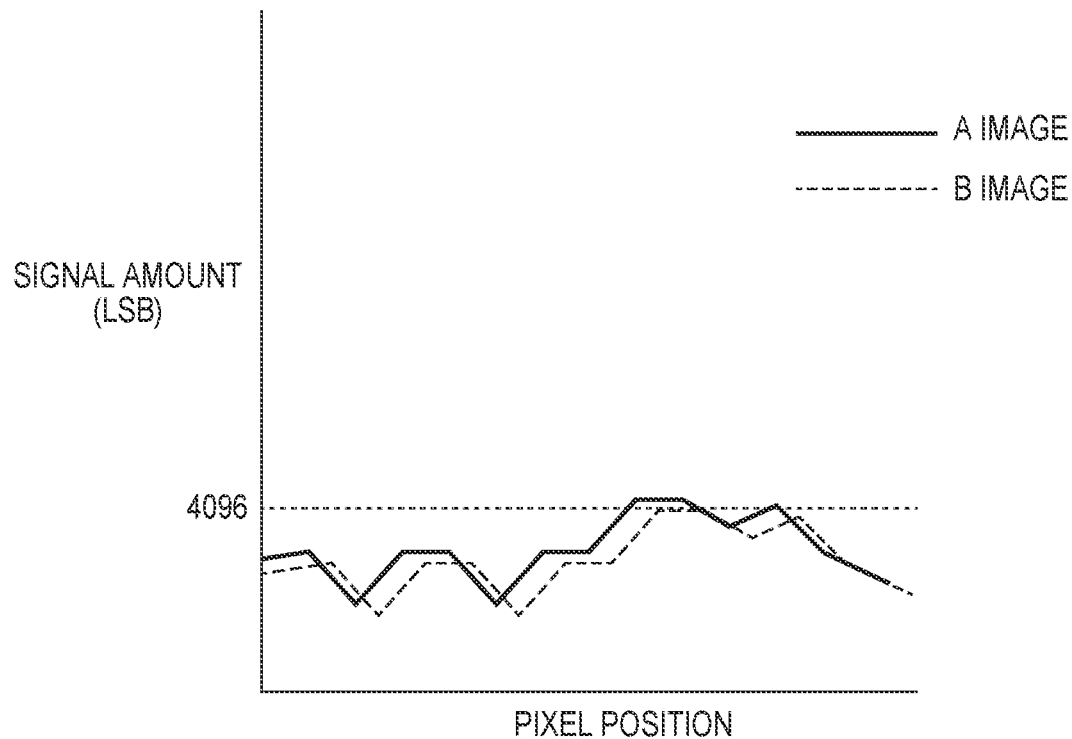
FIGS. 8A and 8B are views illustrating a pixel signal of an AF region.
Figure 8B:
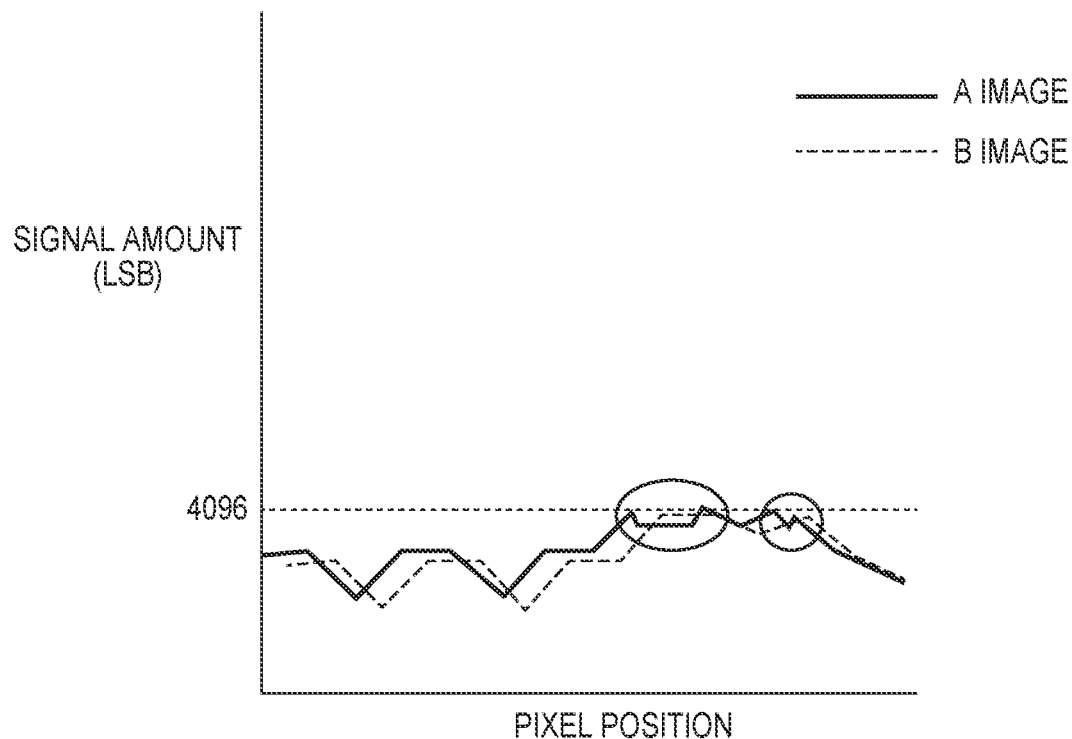

FIGS. 8A and 8B are views illustrating pixel signals of the AF region 702 among the pixel signals obtained by the focus detection sensor 117.

FIG. 8A illustrates the pixel signal in the case where the ADC 205 illustrated in FIG. 5 achieves ideal input/output characteristics. The solid line is an A image obtained from the image forming area 507a, and the dashed line is a B image obtained from the image forming area 507b. While there is a certain amount of level difference due to optical shading of the secondary image forming lens between the pixel signals of the A image and the B image, it is possible to eliminate the impact of the level difference on the AF operation by cutting the DC component by a digital filtering process prior to the correlation operation. Since the input/output characteristics of the low-luminance conversion mode and the high-luminance conversion mode are connected in a straight line form, distortion does not occur in either of the A image or the B image.

Meanwhile, FIG. 8B illustrates a pixel signal of the A image and the B image in the case where the ADC 205 illustrated in FIG. 5 is shifted from the ideal input/output characteristics. For the A image, part of the pixel signal exceeds the boundary voltage (Vm) between the low-luminance conversion mode and the high-luminance conversion mode, but the B image does not exceed the boundary voltage (Vm). In this example, as in FIG. 5, since, at the boundary voltage, the AD converted output in the high-luminance conversion mode is a value that is lower than the AD converted output in the low-luminance conversion mode, distortion occurs in the parts of the A image signal that are circled. This distortion becomes the cause of error occurrence in an AF operation for detecting a phase difference of the A image and the B image.

A processing method for reducing this error will be described by using the flowcharts of FIG. 9 and FIG. 10.

Figure 9:
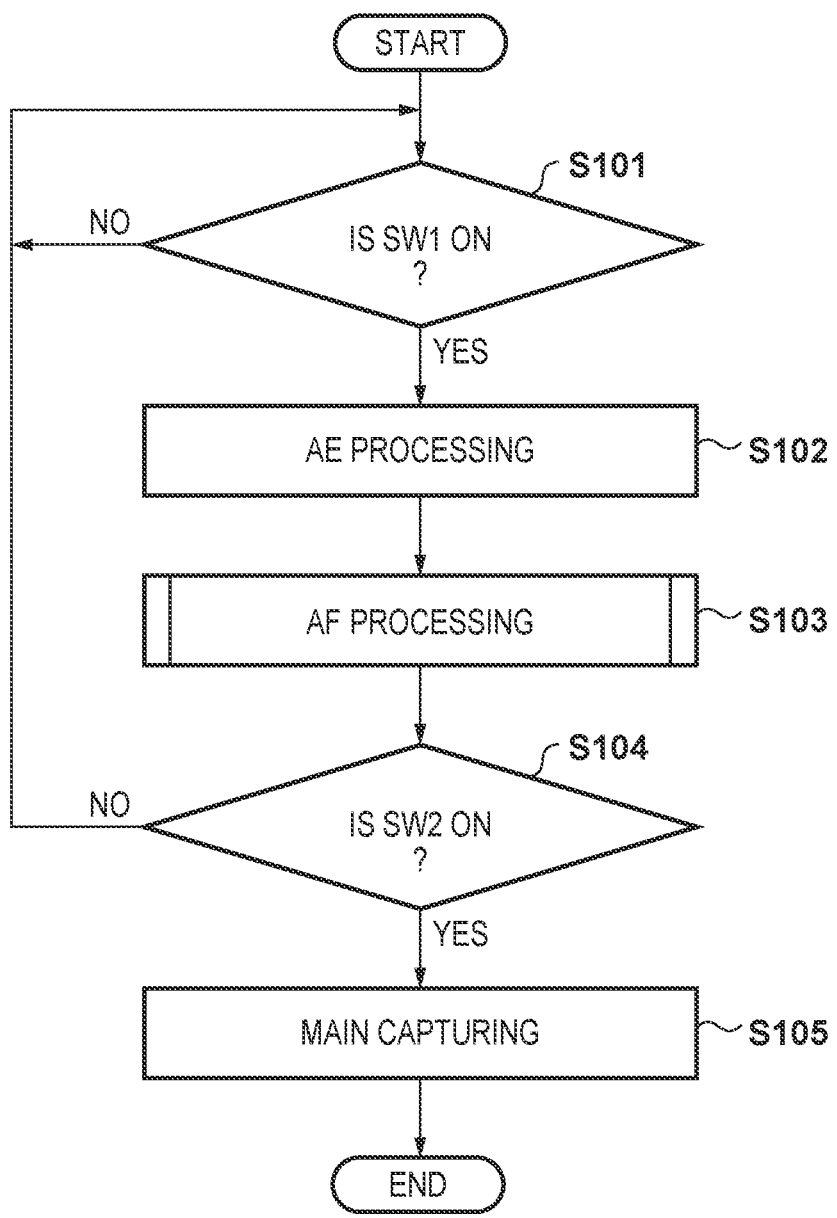
FIG. 9 is a flowchart for describing a digital camera capturing operation.

FIG. 9 is a flowchart illustrating a procedure of capture control processing that is performed by the digital camera 100 illustrated in FIG. 1. The processing of FIG. 9 is performed by the CPU 102 executing a program stored in the memory 103, and assumes a case where the camera 100 is activated.

First, in step S101 (hereinafter, "step" is omitted and only "S" is used to represent each step), the CPU 102 determines whether a shutter switch (release button) has been pressed halfway by the user to instruct image capturing (switch SW1 has been turned on). In a case where the switch SW1 has been turned on, the processing proceeds to S102, and otherwise the processing stands by without any change.

In S102, the CPU 102 controls the photometric sensor 108 to perform AE processing. As a result, a photometric value (hereinafter, "photometric value in steady light") is obtained that includes luminance information related to the subject in steady light. In addition, based on the photometric value in steady light, the following are determined: an exposure control value such as an aperture value and ISO sensitivity during image capturing, and an accumulation time in the focus detection sensor 117.

In S103, the CPU 102 performs a phase difference detection method AF processing (an autofocus operation) by controlling the focus detection sensor 117. The CPU 102 transmits to the LPU 151 the calculated defocus amount. This causes the LPU 151 to move the lens group 152 to the focusing position based on the received amount of defocus. Note that details of the AF processing are described below using the flowchart in FIG. 10.

In S104, the CPU 102 determines whether or not a full press (switch SW2 ON) of the shutter switch was performed by a user. In a case where switch SW2 is on, the processing proceeds to step S105, and if the switch SW2 is not on, the processing returns to step S101.

In step S105, the CPU 102 performs main capturing, and the processing of the present flowchart ends. The overall operation of the digital camera 100 according to the present embodiment has been described.

Figure 10:
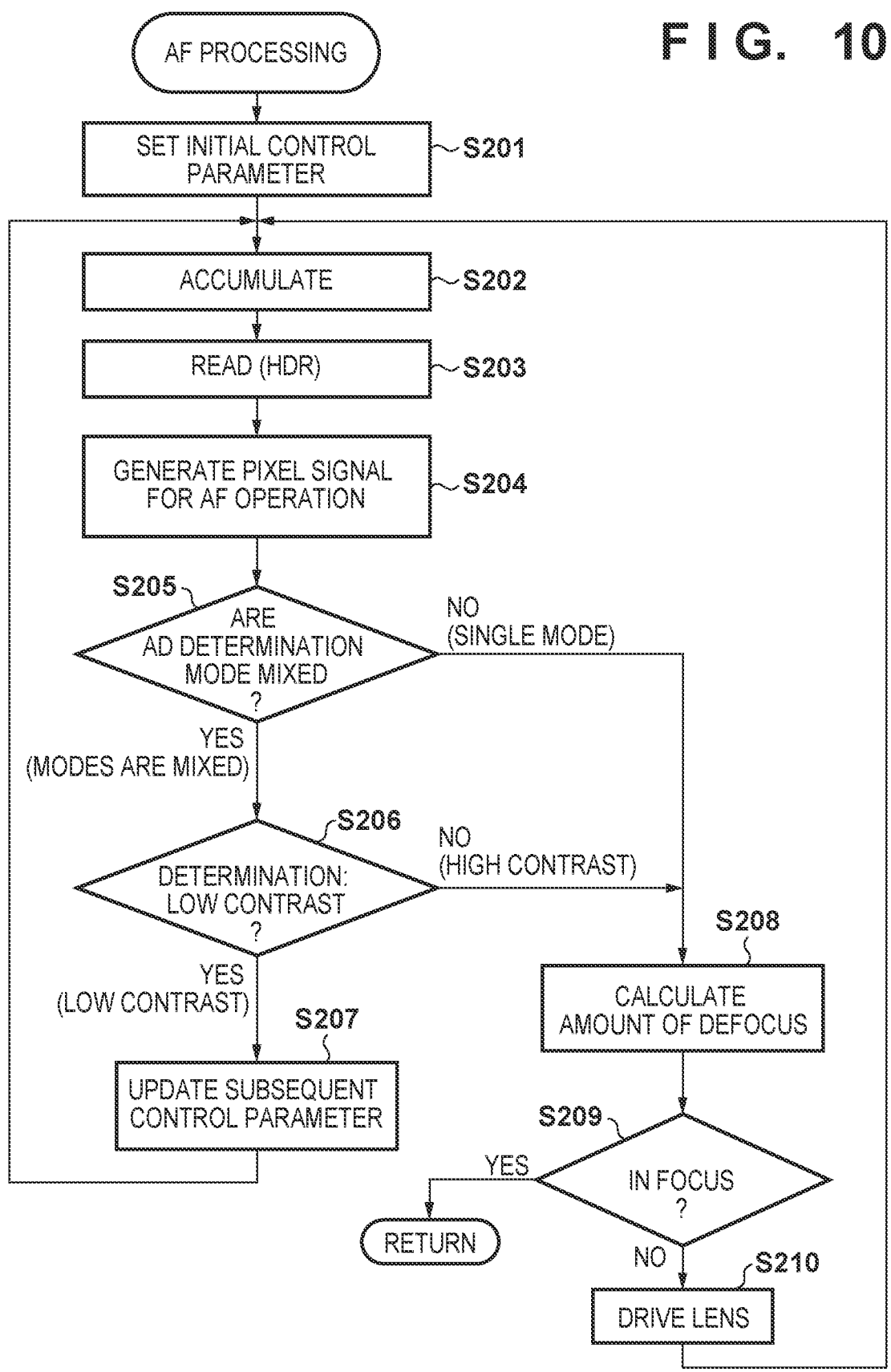
FIG. 10 is a flowchart for describing an AF operation of a first embodiment.

FIG. 10 is a flowchart illustrating a procedure of AF processing (the focus detection operation) of the step S103 of FIG. 9.

In step S201, the CPU 102, based on a photometric value including the luminance information detected in step S102, determines an accumulation time of the focus detection sensor 117. Then, a control parameter for controlling the focus detection sensor 117 in the determined accumulation time is set.

In S202, the CPU 102 controls the focus detection sensor 117 by the control parameter set in S201 and later-described step S207, and causes an image pixel signal to accumulate.

In S203, the CPU 102 controls the focus detection sensor 117 to read a pixel signal (signal value) accumulated in step S202. Regarding an AD conversion operation of the focus detection sensor 117 at the time of read, as described in FIG. 2 and FIG. 4, the AD conversion operates in an HDR (high dynamic range) mode by a voltage corresponding to the output code 4096 LSB being set to a reference voltage Vm.

In S204, the CPU 102 cuts out a portion of the pixel signal obtained in a readout operation of S203, and generates a pixel signal for the AF operation. Here, as described in FIGS. 7A and 7B, the photographer selects an arbitrary position on the viewfinder screen, and the pixel signals of the AF region 702 and 703 corresponding to that position are used as the pixel signal for the AF operation.

In S205, the CPU 102 determines, for the pixel signal (output signal) for the AF operation generated in S204, whether or not the low-luminance conversion mode and the high-luminance conversion mode are mixed (if it is both the low-luminance conversion mode and the high-luminance conversion mode or only one of them). The method of this determination will be described.

In a case where the AD conversion circuit is an ideal input/output characteristic, if the output of the ADC 205 is 4096 LSB or more, the pixel signal is the reference voltage Vm or more, and operates in the high-luminance conversion mode. Meanwhile, if the output of the ADC 205 is 4096 LSB or less, the pixel signal is less than the reference voltage Vm, and operates in the low-luminance conversion mode. However, regarding the actual input/output characteristics, even if the pixel signal is the reference voltage Vm, by gain or offset error, the output of the ADC 205 becomes a value that deviates from 4096 LSB. When the maximum value of the deviation width is a LSB, if the output of the ADC 205 is 4096+α LSB or more, operation is reliably in the high-luminance conversion mode. Meanwhile, if output of the ADC 205 is 4096−α LSB or less, operation is in the low-luminance conversion mode. Accordingly, in the case where "the maximum value of the pixel signal for the AF operation is less than 4096−α LSB" or "the minimum value of the pixel signal for the AF operation is 4096+α LSB or more", it is determined to be a single mode, and the processing transitions to step S208. Meanwhile, in cases other than the above conditions, it is determined that the modes are mixed, and the processing transitions to step S206.

In S206, the CPU 102 determines the contrast of the pixel signal for the AF operation generated in S204. In this example, a maximum value and minimum value difference signal of the pixel signal (hereinafter, described as PB level) is compared with the determination value. In a case where the PB level is lower than the determination value, it is determined to be low contrast, and the processing transitions to the operation of step S207. Meanwhile, in a case where the PB level is greater than or equal to a determination value, it is determined to be a high contrast, and the processing transitions to the operation of step S208.

In step S207, the CPU 102 sets the control parameter for the subsequent accumulation of the focus detection sensor 117. The subsequent accumulation time is set to be twice the current accumulation time, and returns to the operation of the step S202. By making the accumulation time longer, the pixel signal is shifted toward the high-luminance conversion mode in the subsequent accumulation.

In step S208, the CPU 102 calculates the amount of defocus from the pixel signal for the AF operation obtained in step S204.

In step S209, the CPU 102 determines that it is in focus if the amount of defocus obtained in step S208 is within a desired range, for example, ¼ Fδ or less (F: the aperture value of the lens, δ: a constant (20 μm)). Specifically, if the aperture value of the lens F=2.0, it is determined to be in focus if the amount of defocus is 10 μm or less, and the AF processing is ended.

Meanwhile, if the amount of defocus is larger than ¼ Fδ, in step S210, the CPU 102 calculates the lens drive amount from the amount of defocus obtained in step S208, and instructs the lens 150 to drive the lens group 152. Next, the CPU 102 returns the processing to step S202, and repeats the operations of step S202 to step S210 until the in-focus state is determined.

As described above, in the present embodiment, in step S205, it is determined whether or not the high-luminance conversion mode and the low-luminance mode are mixed for the pixel signal for the AF operation. Then, if they are mixed, next, in step S206, the pixel signal contrast is determined, and it is determined whether or not it is low contrast for which the impact of distortion of the AD conversion is large. In a case where the AD conversion mode is mixed and it is low contrast, in step S207, so that the pixel signal is AD converted all in the high-luminance mode, the subsequent control parameter is changed and the accumulation time is made longer. Since it is possible to control so that the pixel signal does not include a value at the boundary between the low-luminance conversion mode and the high-luminance conversion mode, it is possible to prevent (inhibit) the occurrence of distortion as in FIG. 8B.

Note that in the above-described embodiment, in the case where in step S205, the low-luminance conversion mode and the high-luminance conversion mode are mixed, in step S207, the subsequent accumulation time is lengthened to cause a shift toward the high-luminance conversion mode. However, conversely, configuration may be taken so as to, in the case where in step S205 the low-luminance conversion mode and the high-luminance conversion mode are mixed, shorten the subsequent accumulation time in step S207, and cause a shift toward the low-luminance conversion mode.

Second Embodiment

Next, a second embodiment will be described.

Figure 11:
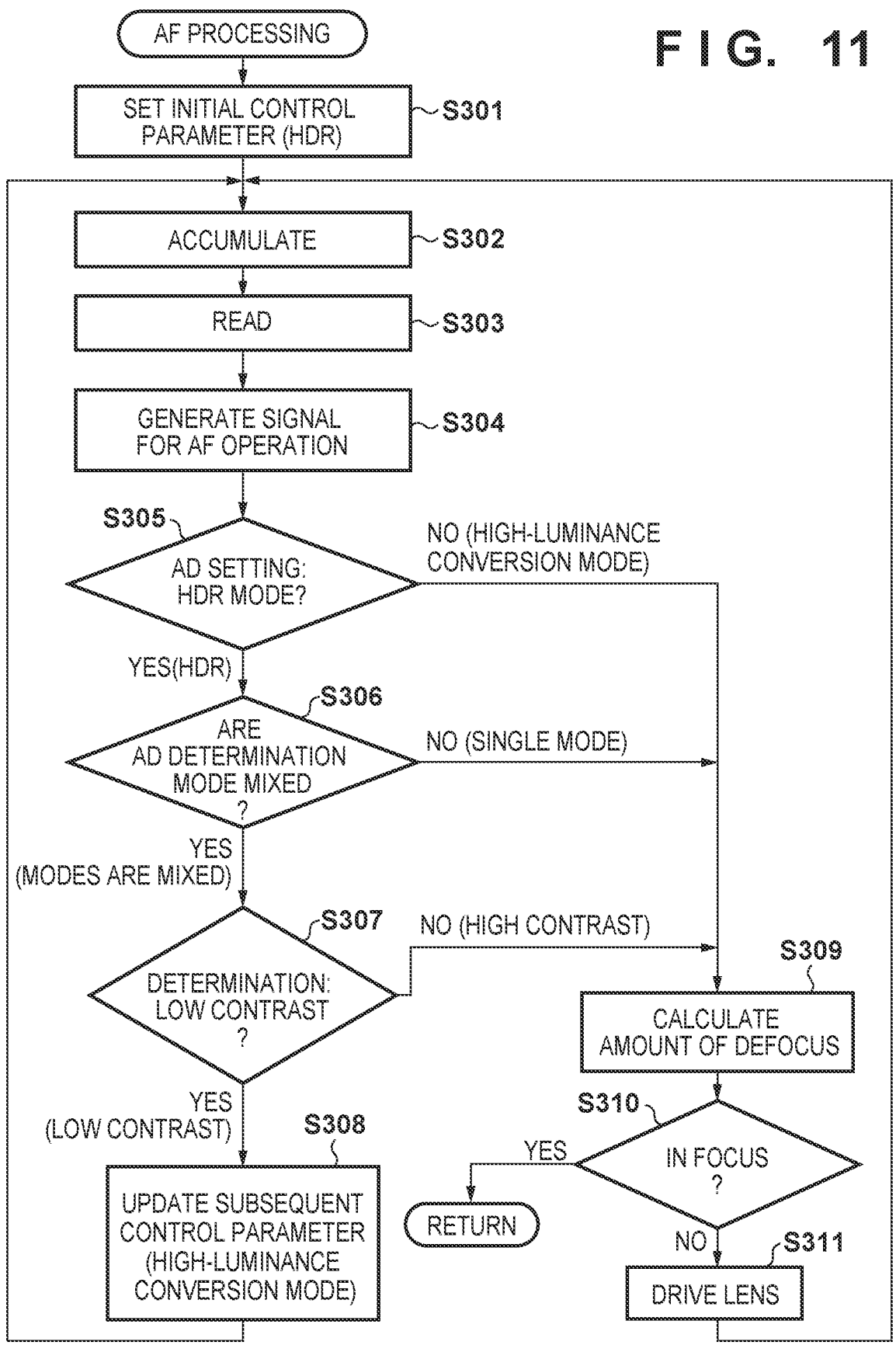
FIG. 11 is a flowchart for describing an AF operation of a second embodiment.

FIG. 11 is a flowchart illustrating a procedure of the second embodiment of the AF processing of step S103 of FIG. 9. Operation is different to FIG. 10 of the first embodiment. Other configurations are the same as in the first embodiment, and so description is omitted.

In step S301, the CPU 102, based on a photometric value including the luminance information detected in step S102 of FIG. 9, determines an accumulation time of the focus detection sensor 117. Then, a control parameter for controlling the focus detection sensor 117 in the determined accumulation time is set. Also, regarding the ADC 205, by setting a voltage corresponding to the output code 4096 LSB to the reference voltage Vm, the ADC 205 operates in the HDR mode.

In step S302, the CPU 102 controls the focus detection sensor 117 by the control parameter set in step S301 and causes an accumulation operation to be performed.

In step S303, the CPU 102 controls the focus detection sensor 117 to read the pixel signal accumulated in step S302. In the AD conversion operation of the focus detection sensor 117 at the time of reading, the setting the reference voltage Vm in accordance with the operation of step S301 or later-described step S308 results in an AD conversion operation in the HDR mode or the high-luminance conversion mode.

In step S304, the CPU 102 cuts out a part of the pixel signal obtained in the readout operation of step S303, and generates a pixel signal for the AF operation. Here, as described in FIGS. 7A and 7B, the photographer selects an arbitrary position on the viewfinder screen, and the pixel signals of the AF region 702 and 703 corresponding to that position are used as the pixel signal for the AF operation.

In step S305, the CPU 102 determines whether or not an AD conversion setting at a time of read out of the pixel signal in step S303 is for an HDR mode. In the case of the HDR mode, the processing transitions to step S306. Meanwhile, in the case of an AD operation in the high-luminance conversion mode, the processing transitions to step S309.

In step S306, the CPU 102, for a pixel signal for the AF operation generated in step S304, determines whether or not the low-luminance conversion mode and the high-luminance conversion mode are mixed. Accordingly, in the case where "the maximum value of the pixel signal for the AF operation is less than 4096−α LSB" or "the minimum value of the pixel signal for the AF operation is 4096+α LSB or more", it is determined to be a single mode, and the processing transitions to step S309. Meanwhile, other than in the case of the above-described condition, it is determined to be the mixed mode, and the processing transitions to step S307.

In step S307, the CPU 102 determines the contrast of the pixel signal for the AF operation generated in step S304. Here, a maximum value and minimum value difference signal of the pixel signal (hereinafter, described as PB level) is compared with the determination value. In a case where the PB level is lower than the determination value, it is determined to be low contrast, and the processing transitions to the operation of step S308. Meanwhile, in a case where the PB level is greater than or equal to the determination value, it is determined to be high contrast, and the processing transitions to the operation of S309.

In S308, the CPU 102 sets the control parameter for the subsequent accumulation of the focus detection sensor 117. By setting the reference voltage Vm to be lower than the voltage corresponding to 0 LSB, in the subsequent accumulation, it will change to be an AD operation only in the high-luminance conversion mode; then, the processing returns to the operation of step S302.

In step S309, the CPU 102 calculates the amount of defocus from the pixel signal for the AF operation obtained in step S304.

In step S310, the CPU 102 determines that it is in focus if the amount of defocus calculated in step S309 is within a desired range, for example, ¼ Fδ or less (F: the aperture value of the lens, δ: a constant (20 μm)). Specifically, if the aperture value of the lens F=2.0, it is determined to be in focus if the amount of defocus is 10 μm or less, and the AF processing is ended.

Meanwhile, if the amount of defocus is larger than ¼ Fδ, in step S311, the CPU 102 calculates the lens drive amount from the amount of defocus obtained in step S309, and instructs the lens 150 to drive the lens group 152. Next, the CPU 102 returns the processing to step S302, and repeats the operations of step S302 to step S311 until the in-focus state is determined.

As described above, in the present embodiment, in step S306, it is determined whether or not the high-luminance conversion mode and the low-luminance mode are mixed for the pixel signal for the AF operation. Then, if they are mixed, next, in step S307, the pixel signal contrast is determined, and it is determined whether or not it is low contrast for which the impact of distortion of the AD conversion is large. In a case where the AD conversion mode is mixed and it is low contrast, in step S308, so that the pixel signal is AD converted all in the high-luminance mode, the reference voltage Vm is set lower than the voltage corresponding to 0 LSB. Since it is possible to control so that the pixel signal does not include a value at the boundary between the low-luminance conversion mode and the high-luminance conversion mode, it is possible to prevent the occurrence of distortion as in FIG. 8B.

Note that in the above embodiment, in the case where the low-luminance conversion mode and the high-luminance conversion mode are mixed in step S306, in step S308, by setting the reference voltage Vm lower at the time of subsequent focus detection, it results in an AD operation only in the high-luminance conversion mode in the subsequent accumulation. However, conversely, configuration may be taken so as to, in the case where the low-luminance conversion mode and the high-luminance conversion mode are mixed in step S306, in step S308, set the reference voltage Vm higher at the time of subsequent focus detection, to have an AD operation only in the low-luminance conversion mode in the subsequent accumulation.

Third Embodiment

Next, a third embodiment will be described.

Figure 12:
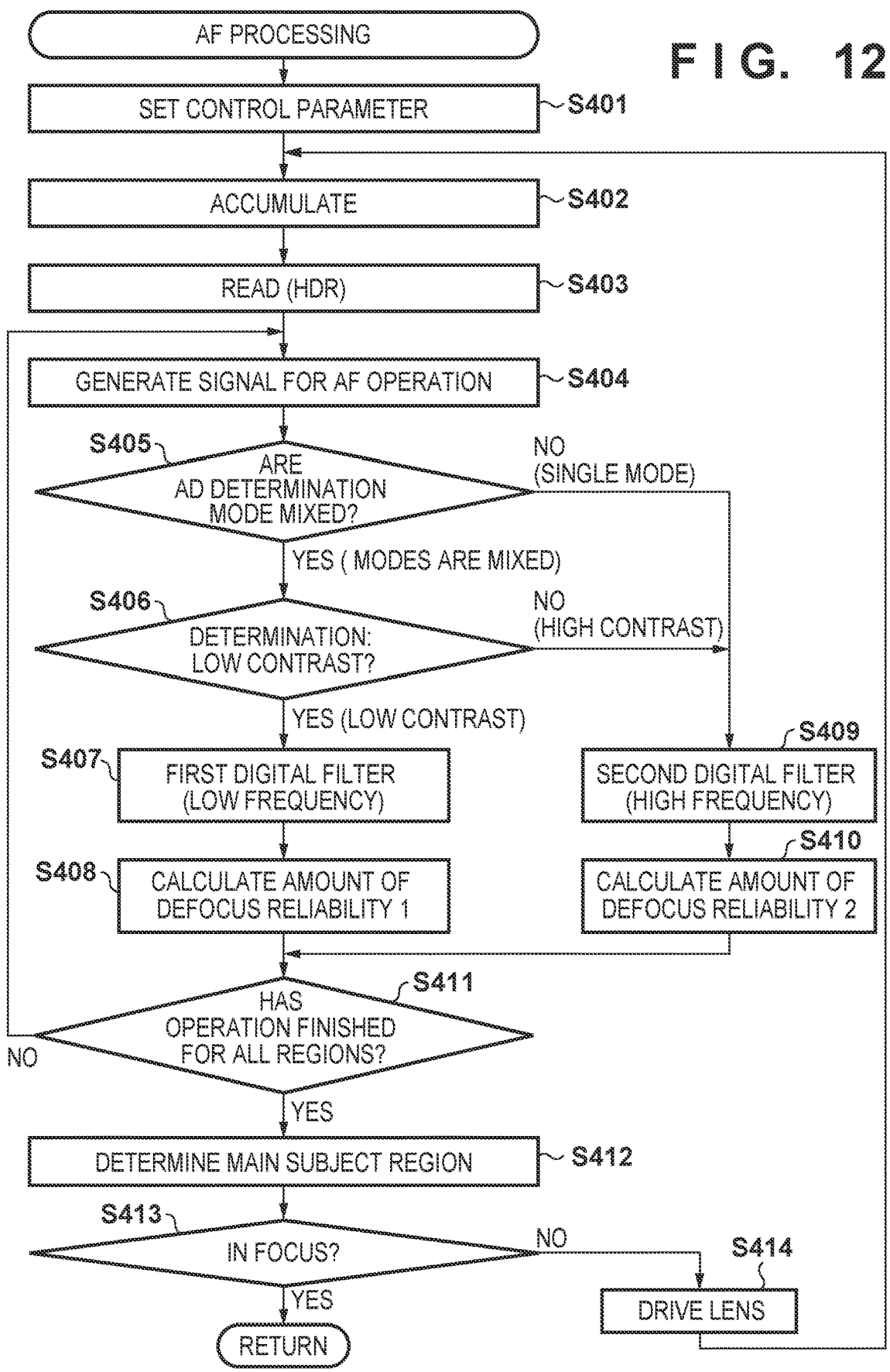
FIG. 12 is a flowchart for describing an AF operation of a third embodiment.

FIG. 12 is a flowchart illustrating a procedure of the third embodiment of AF processing of the S103 of FIG. 9. Operation is different to FIG. 10 of the first embodiment and FIG. 11 of the second embodiment. Other configurations are the same as in the first embodiment, and so description is omitted.

In S401, the CPU 102, based on a photometric value including the luminance information detected in S102 of FIG. 9, determines an accumulation time of the focus detection sensor 117. Then, a control parameter for controlling the focus detection sensor 117 in the determined accumulation time is set.

In step S402, the CPU 102 controls the focus detection sensor 117 by the control parameter set in step S401 and causes an accumulation operation to be performed.

In step S403, the CPU 102 controls the focus detection sensor 117 to read the pixel signal accumulated in step S402. Regarding an AD conversion operation of the focus detection sensor 117 at the time of read, as described in FIG. 2 and FIG. 4, the column AD converter 205 operates in an HDR mode by a voltage corresponding to the output code 4096 LSB being set to a reference voltage Vm.

In step S404, the CPU 102 cuts out a portion of the pixel signal obtained in a readout operation of step S403, and generates a pixel signal for the AF operation. Here, the image forming areas 507a, 507b, 508a, and 508b are divided into a plurality of regions, the respective regions are extracted in order.

In step S405, the CPU 102, for a pixel signal for the AF operation generated in step S404, determines whether or not the low-luminance conversion mode and the high-luminance conversion mode are mixed. In the case where "the maximum value of the pixel signal for the AF operation is less than 4096−α LSB" or "the minimum value of the pixel signal for the AF operation is 4096+α LSB or more", it is determined to be a single mode, and the processing transitions to step S409. Meanwhile, in cases other than the above conditions, it is determined that the modes are mixed, and the processing transitions to step S406.

In step S406, the CPU 102 determines the contrast of the pixel signal for the AF operation generated in step S404. In this example, a maximum value and minimum value difference signal of the pixel signal (hereinafter, described as PB level) is compared with the determination value. In a case where the PB level is lower than the determination value, it is determined to be low contrast, and the processing transitions to the operation of step S407. Meanwhile, in a case where the PB level is greater than or equal to the determination value, it is determined to be high contrast, and the processing transitions to the operation of step S409.

In step S407, the CPU 102, in relation to the pixel signal for the AF operation generated in step S404, applies a digital filter (bandpass filter) having a first bandpass characteristic (frequency characteristic) that allows a relatively low frequency band to pass. Also, next, in step S408, the amount of defocus is calculated. The reliability of the operation result obtained by this operation is stored in the memory 103 in the digital camera 100 as reliability 1.

In step S409, the CPU 102, in relation to the pixel signal for an AF operation generated in step S404, applies a digital filter (bandpass filter) having a second bandpass characteristic (frequency characteristic) that allows a higher frequency band to pass through than a first bandpass characteristic. Then, next, in step S410, the amount of defocus is calculated. The reliability of the operation result obtained by this operation is stored in the memory 103 in the digital camera 100 as reliability 2 which is a higher reliability than reliability 1.

In step S411, the CPU 102 determines whether or not an amount of defocus was calculated for all of the plurality of regions that the image forming areas 507a, 507b, 508a, and 508b were divided into. If the processing of all of the regions has ended, the processing transitions to step S412. Meanwhile, if there is a region that has not been processed, the processing returns to the operation of step S404, and the amount of defocus of the next region is calculated. Until the processing of all of the regions ends, the operations of step S404 to step S411 repeats.

In step S412, the CPU 102 determines the amount of defocus of a main subject from among the plurality of amounts of defocus calculated by the operations of step S408 and step S410. Here, firstly, the amount of defocus corresponding to the subject whose distance is the closest, among those of reliability 2, is selected. If there is no result of reliability 2, the amount of defocus corresponding to the subject whose distance is the closest, among those of reliability 1, is selected.

In step S413, the CPU 102 determines that it is in focus if the amount of defocus selected in step S412 is within a desired range, for example within ¼ Fδ (F: lens aperture value, δ: constant (20 μm)). Specifically, if the aperture value of the lens F=2.0, it is determined to be in focus if the amount of defocus is 10 μm or less, and the AF processing is ended.

Meanwhile, if the amount of defocus is larger than ¼ Fδ, in step S414, the CPU 102 calculates the lens drive amount from the amount of defocus determined in step S412, and instructs the lens 150 to drive the lens group 152. Then, the CPU 102 returns the processing to step S402, and repeats the operations of step S402 to step S414 until the in-focus state is determined.

As described above, in the present embodiment, in a case of performing an AF operation based on a pixel signal including a value of the boundary between the low-luminance conversion mode and the high-luminance conversion mode, a digital filter having first bandpass characteristics is applied in step S407. As a result, the occurrence of a distortion as with FIG. 8B can be prevented.

Fourth Embodiment

Next, a fourth embodiment will be described in detail based on the attached drawings.

The configuration of the image capturing apparatus is similar to the first embodiment. In the fourth embodiment, focus detection is performed by the image sensor 104. The image sensor 104 is a two-dimensional C-MOS area sensor, and has a circuit configuration similar to that of the focus detection sensor 117.

Figure 13:
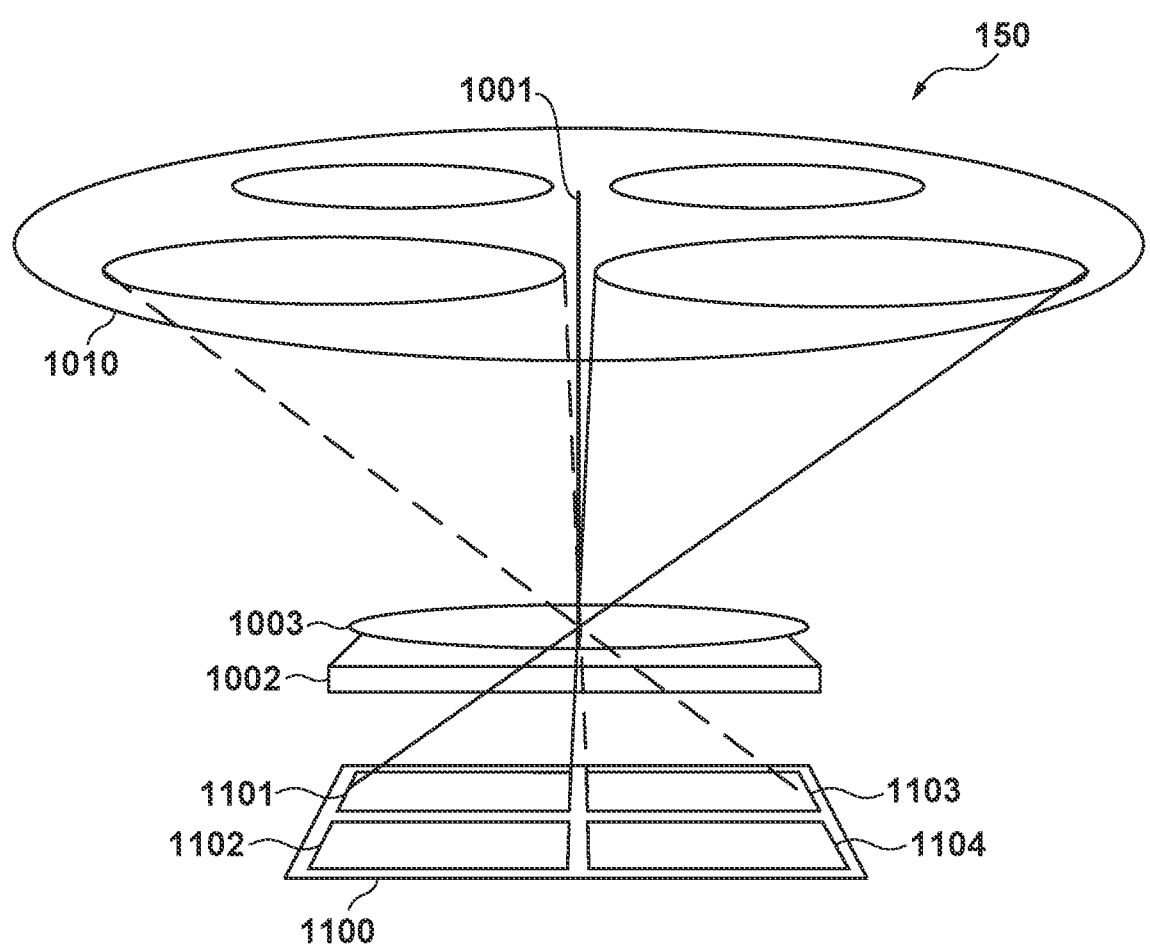
FIG. 13 is a schematic diagram illustrating how light enters a unit pixel of an image sensor 104.

FIG. 13 illustrates a schematic diagram showing a situation in which a luminous flux emitted from an exit pupil of the imaging lens is incident on a unit pixel of the image sensor in the image capturing unit 104.

In FIG. 13, the unit pixel 1100 has 2×2 photodiodes 1101, 1102, 1103, and 1104. A color filter 1002 and a microlens 1003 are disposed in front of a unit pixel 1100. The lens 150 includes an exit pupil 1010. When the optical axis 1001 is made to be the center of the luminous flux emitted from the exit pupil 1010 in relation to the unit pixel 1100 having the microlens 1003, the light that passes through the exit pupil 1010 is incident on the unit pixel 1100 with the optical axis 1001 as the center.

According to the 2×2 photodiodes 1101, 1102, 1103, and 1104, the exit pupil 1010 of the lens 150 is divided. By forming pair images changing the combination of the photodiode 1101, 1102, 1103, and 1104 whose pupil positions are different, focus detection becomes possible.

The signals obtained by the photodiodes 1101 and 1102 are added to get the A image and the signals of the photodiodes 1103 and 1104 are added to get the B image. By performing similar processing in neighboring pixels, it is possible to obtain equivalent subject image for the image forming areas 508a and 508b. Meanwhile, the signals obtained by the photodiodes 1101 and 1103 are added to get the A image and the signals of the photodiodes 1102 and 1104 are added to get the B image. By performing similar processing in neighboring pixels, it is possible to obtain equivalent subject image for the image forming areas 507a and 507b.

Next, regarding the flowcharts for an image capture operation and an AF operation of FIGS. 9 to 12, the sensor is changed from the focus detection sensor 117 of the first embodiment to the image sensor 104, but the processing flow does not change. Accordingly, the description will be omitted here, but a similar effect can be achieved to the first embodiment.

Note that since the image sensor 104 serves to perform both a focus detection function and a live-view display function, when the control parameter is changed in step S207 of FIG. 10 and step S308 of FIG. 11, it is necessary to control so that the live-view display to the user does not change conspicuously.

For example, one technique is reduce the amount of a change of the display luminance by applying a digital gain to the obtained image signal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-189657, filed Oct. 16, 2019, and Japanese Patent Application No. 2020-123914, filed Jul. 20, 2020, which are hereby incorporated by reference herein in their entirety.

What is claimed is:

1. A focus detection apparatus, comprising:
an image sensor having a plurality of pixels that receive light from a subject that passes through an imaging lens; and
an analog-digital (AD) converter configured to, in accordance with a signal value of a pixel signal of the plurality of pixels, switch a low-luminance conversion mode and a high-luminance conversion mode, and perform an AD conversion of a signal from the plurality of pixels; and
at least one processor or circuit configured to function as:
a determination unit configured to determine whether an output signal from the AD converter is a signal AD converted in both the low-luminance conversion mode and the high-luminance conversion mode or a signal AD converted in only one of the low-luminance conversion mode and the high-luminance conversion mode;
an inhibition unit configured to, in a case where the output signal from the AD converter is determined by the determination unit to be the signal AD converted in both the low-luminance conversion mode and the high-luminance conversion mode, inhibit a level difference of the output signal at a boundary between the low-luminance conversion mode and the high-luminance conversion mode; and
a calculation unit configured to, based on the signal for which the level difference is inhibited, calculate an amount of defocus of the imaging lens.

2. The focus detection apparatus according to claim 1, wherein the inhibition unit, so that it is possible to perform the AD conversion of the signal from the plurality of pixels in only one of the low-luminance conversion mode and the high-luminance conversion mode in a subsequent focus detection, changes an accumulation time of an accumulation in a subsequent focus detection operation of the image sensor.

3. The focus detection apparatus according to claim 2, wherein the inhibition unit, so that it is possible to perform the AD conversion of the signal from the plurality of pixels in only the high-luminance conversion mode in the subsequent focus detection, changes the accumulation time of the accumulation in the subsequent focus detection operation of the image sensor to be longer.

4. The focus detection apparatus according to claim 2, wherein the inhibition unit, so that it is possible to perform the AD conversion of the signal from the plurality of pixels in only the low-luminance conversion mode in the subsequent focus detection, changes the accumulation time of the accumulation in the subsequent focus detection operation of the image sensor to be shorter.

5. The focus detection apparatus according to claim 2, wherein the inhibition unit, in a case where a contrast of the pixel signal is lower than a predetermined value, changes the accumulation time of the accumulation in the subsequent focus detection operation of the image sensor.

6. The focus detection apparatus according to claim 1, wherein the inhibition unit, so that it is possible to perform the AD conversion of the signal from the plurality of pixels in only one of the low-luminance conversion mode and the high-luminance conversion mode in a subsequent focus detection, changes a signal value that is a boundary between the low-luminance conversion mode and the high-luminance conversion mode.

7. The focus detection apparatus according to claim 6, wherein the inhibition unit, so that it is possible to perform the AD conversion of the signal from the plurality of pixels in only the high-luminance conversion mode in the subsequent focus detection, lowers the signal value that is a boundary between the low-luminance conversion mode and the high-luminance conversion mode.

8. The focus detection apparatus according to claim 6, wherein the inhibition unit, so that it is possible to perform the AD conversion of the signal from the plurality of pixels in only the low-luminance conversion mode in the subsequent focus detection, raises the signal value that is a boundary between the low-luminance conversion mode and the high-luminance conversion mode.

9. The focus detection apparatus according to claim 6, wherein the inhibition unit, in a case where a contrast of the pixel signal is lower than a predetermined value, changes the signal value that is a boundary between the low-luminance conversion mode and the high-luminance conversion mode.

10. The focus detection apparatus according to claim 1, wherein the inhibition unit, by changing a frequency characteristic of the output signal from the AD converter, inhibits the level difference of the output signal at the boundary between the low-luminance conversion mode and the high-luminance conversion mode.

11. The focus detection apparatus according to claim 10, wherein the inhibition unit, by applying a bandpass filter of a first band to the output signal from the AD converter, inhibits the level difference of the output signal at the boundary between the low-luminance conversion mode and the high-luminance conversion mode.

12. The focus detection apparatus according to claim 11, wherein the calculation unit, in a case of calculating the amount of defocus based on the signal obtained by applying the bandpass filter of the first band to the output signal from the AD converter, makes a reliability of the amount of defocus lower than a value of a predetermined reliability.

13. The focus detection apparatus according to claim 11, wherein the inhibition unit, in a case where a contrast of the pixel signal is lower than a predetermined value, by applying the bandpass filter of the first band to the output signal from the AD converter, inhibits the level difference of the output signal at the boundary between the low-luminance conversion mode and the high-luminance conversion mode.

14. The focus detection apparatus according to claim 11, wherein the inhibition unit, in a case where the output signal from the AD converter is AD converted by only one of the low-luminance conversion mode and the high-luminance conversion mode, applies the bandpass filter of a second band of a higher frequency than the first band to the output signal from the AD converter.

15. The focus detection apparatus according to claim 1, wherein the image sensor is an image sensor dedicated to focus detection.

16. The focus detection apparatus according to claim 1, wherein the image sensor also serves as an image sensor for capturing an image for recording.

17. An image capturing apparatus including a focus detection apparatus comprising:
   an image sensor having a plurality of pixels that receive light from a subject that passes through an imaging lens; and
   an analog-digital (AD) converter configured to, in accordance with a signal value of a pixel signal of the plurality of pixels, switch a low-luminance conversion mode and a high-luminance conversion mode, and perform an AD conversion of a signal from the plurality of pixels; and
   at least one processor or circuit configured to function as:
   a determination unit configured to determine whether an output signal from the AD converter is a signal AD converted in both the low-luminance conversion mode and the high-luminance conversion mode or a signal AD converted in only one of the low-luminance conversion mode and the high-luminance conversion mode;
   an inhibition unit configured to, in a case where the output signal from the AD converter is determined by the determination unit to be the signal AD converted in both the low-luminance conversion mode and the high-luminance conversion mode, inhibit a level difference of the output signal at a boundary between the low-luminance conversion mode and the high-luminance conversion mode; and
   a calculation unit configured to, based on the signal for which the level difference is inhibited, calculate an amount of defocus of the imaging lens.

18. A method of controlling a focus detection apparatus that is equipped with an image sensor having a plurality of pixels that receive light from a subject that passes through an imaging lens; and an analog-digital (AD) converter configured to, in accordance with a signal value of a pixel signal of the plurality of pixels, switch a low-luminance conversion mode and a high-luminance conversion mode, and perform an AD conversion of a signal from the plurality of pixels, the method comprising:
   determining whether an output signal from the AD converter is a signal AD converted in both the low-luminance conversion mode and the high-luminance conversion mode or a signal AD converted in only one of the low-luminance conversion mode and the high-luminance conversion mode;
   in a case where the output signal from the AD converter is determined by the determination unit to be the signal AD converted in both the low-luminance conversion mode and the high-luminance conversion mode, inhibiting a level difference of the output signal at a boundary between the low-luminance conversion mode and the high-luminance conversion mode; and
   based on the signal for which the level difference is inhibited, calculating an amount of defocus of the imaging lens.

19. A non-transitory computer-readable storage medium storing a program for causing a computer to execute each step of a method of controlling a focus detection apparatus that is equipped with an image sensor having a plurality of pixels that receive light from a subject that passes through an imaging lens; and an analog-digital (AD) converter configured to, in accordance with a signal value of a pixel signal of the plurality of pixels, switch a low-luminance conversion mode and a high-luminance conversion mode, and perform an AD conversion of a signal from the plurality of pixels, the method comprising:
   determining whether an output signal from the AD converter is a signal AD converted in both the low-luminance conversion mode and the high-luminance conversion mode or a signal AD converted in only one of the low-luminance conversion mode and the high-luminance conversion mode;
   in a case where the output signal from the AD converter is determined by the determination unit to be the signal AD converted in both the low-luminance conversion mode and the high-luminance conversion mode, inhibiting a level difference of the output signal at a boundary between the low-luminance conversion mode and the high-luminance conversion mode; and
   based on the signal for which the level difference is inhibited, calculating an amount of defocus of the imaging lens.

* * * * *